United States Patent [19]

Colas

[11] Patent Number: 5,079,311

[45] Date of Patent: Jan. 7, 1992

[54] ALKOXY FUNCTIONAL RESINS AND COMPOSITIONS CONTAINING THEM

[75] Inventor: Andre R. L. Colas, Glashuetten, Fed. Rep. of Germany

[73] Assignee: Dow Corning Limited, Barry, Wales

[21] Appl. No.: 463,074

[22] Filed: Jan. 10, 1990

[30] Foreign Application Priority Data

Feb. 1, 1989 [GB] United Kingdom ............. 8902184

[51] Int. Cl.$^5$ ............................................. C08F 283/00
[52] U.S. Cl. ....................................... 525/478; 528/15; 528/18
[58] Field of Search ............... 525/478; 528/15, 18

[56] References Cited

U.S. PATENT DOCUMENTS

| | | | |
|---|---|---|---|
| 2,460,457 | 10/1949 | Hyde | 260/46.5 |
| 2,676,182 | 2/1954 | Daudt et al. | 260/448.2 |
| 3,647,846 | 4/1972 | Hartlein et al. | 260/448.2 |
| 3,884,866 | 9/1975 | Jeram et al. | 260/328 SB |
| 3,957,713 | 8/1976 | Jeram et al. | 260/328 SB |
| 4,143,088 | 10/1979 | Faure et al. | 260/825 |
| 4,465,805 | 8/1984 | Blizzard et al. | 525/474 |
| 4,772,675 | 9/1988 | Klowsowski et al. | 528/15 |
| 4,774,310 | 7/1988 | Butler | 528/23 |
| 4,849,491 | 7/1989 | Ogawa et al. | 528/15 |

Primary Examiner—Melvyn I. Marquis
Attorney, Agent, or Firm—Roger H. Borrousch

[57] ABSTRACT

This invention discloses MQ silicone resins having tetravalent units of the formula $SiO_2$ and monovalent units of the formula $R_aR'_{3-a}SiO_{\frac{1}{2}}$ wherein R' denotes a group of the general formula $-R''Si(OR^*)_3$ with R" being an alkylene group and R* an alkyl group and wherein a has a value of 2 or 3, preferably 2 for up to 30% of all monovalent units. There is also described a method of making these resins and a composition comprising hydroxy end-blocked polydiorganosiloxanes, MQ resins of the invention and a catalyst. This gives elastomer-forming compositions which have low viscosity in the uncured state whilst retaining good physical properties when cured.

15 Claims, No Drawings

ALKOXY FUNCTIONAL RESINS AND COMPOSITIONS CONTAINING THEM

This invention is concerned with organosilicon resins, particularly MQ resins having alkoxy functional groups and with compositions, especially elastomer-forming compositions containing them.

Resins which consist of triorganosiloxane ($R_3SiO_{\frac{1}{2}}$) units and $SiO_{4/2}$ units are known and are commercially available materials. These resins are sometimes referred to as MQ resins in view of the presence of the monovalent (M) siloxane units ($R_3SiO_{\frac{1}{2}}$) and tetravalent or quadrivalent (Q) siloxane units ($SiO_{4/2}$). Resins of this type wherein the organic group R is alkyl are described for example in G.B. Patent Specification 603 076 and 706 719. A small number of the silicon-bonded substituents may be hydroxyl or alkoxy groups. MQ resins which contain silicon-bonded hydrogen atoms are also known and have been described e.g. in G.B. Patent Specification 1 418 601 and E.P. Patent Specification 251 435.

The present invention provides MQ resins which consist of tetravalent units of the formula $SiO_{4/2}$ and monovalent units characterised in that essentially all monovalent units have the general formula $R_aR'_{3-a}SiO_{\frac{1}{2}}$, wherein R denotes an alkyl or aryl group having from 1 to 8 carbon atoms, R' is a group of the general formula $-R''Si(OR^*)_3$, wherein R'' is a divalent alkylene group having up to 10 carbon atoms in the chain linking the two silicon atoms together, $R^*$ is an alkyl group having up to 8 carbon atoms and a has a value of 2 or 3, there being at least one R' group per molecule.

The M:Q ratio influences the viscosity of the resins. For example when R is methyl, a M:Q ratio greater than 1:1 gives liquid resins at ambient temperature. These liquid resins have a viscosity at 25° C. of from about 100 mm$^2$/s for the higher M:Q ratios to more than 0.1 m$^2$/s when the ratio is 1:1. When the M:Q ratio drops below 1:1 resins where R is methyl are solid at ambient temperature Preferably the resins have a M:Q ratio of from 0.4:1 to 2:1, more preferably 0.7:1 to 1.8:1. Most preferably they are liquid, having a M:Q ratio greater than 1.2:1.

The groups R of the resins of the invention are alkyl or aryl groups. Preferably they are short chain alkyl, e.g. ethyl, propyl or isopropyl and most preferably substantially all R groups are methyl groups The group R'' may be any alkylene group, which links the two silicon atoms with up to 10 carbon atoms. These include methylene, propylene, isobutylene and hexylene. It is preferred that the R'' group is an alkylene group having 2 or 3 carbon atoms linking the two silicon atoms, for example dimethylene or isopropylene (each having 2 carbon atoms in the linking chain) or propylene or isobutylene (each having 3 carbon atoms in the linking chain). Most preferred is the dimethylene group. Each $OR^*$ group in the R' substituent is an alkoxy group having up to 8 carbon atoms, e.g. methoxy, ethoxy, butoxy and heptoxy. Preferably the $OR^*$ groups are all the same, and most preferably they are methoxy groups.

At least one R' group must be present in each molecule. It is however preferred that from 0.1 to 30% of all monovalent units of the resin comprise a R' group. This gives the resin sufficient reactivity to be useful as e.g. crosslinking centres of certain elastomer forming compositions. R' groups may be selected for example from the group comprising $-CH_2CH_2Si(OCH_3)_3$ and $-(CH_2)_3Si(OCH_2CH_3)_3$. Small amounts of other substituents bonded to the monovalent silicon atom, for example hydroxyl or alkoxy groups or hydrogen atoms, may however also be present in the resins of the invention. Preferably no more than 3% of all monovalent units have such substituents. It is most preferred that from 0 to a maximum of 1% of all monovalent units have such substituents. These may be unreacted substituents which were present in the MQ resin used for the manufacture of the resins of the invention.

The invention also provides a method for making the MQ resins of the invention, which comprises reacting MQ resins which consist essentially of tetravalent units of the formula $SiO_{4/2}$ and monovalent units of the general formula $R_aH_{3-a}SiO_{\frac{1}{2}}$, wherein R denotes an alkyl or aryl group having from 1 to 8 carbon atoms and a has a value of 2 or 3, there being at least one silicon bonded H atom per molecule with silanes of the general formula $XSi(OR^*)_3$, wherein X represents an alkenyl group and $R^*$ denotes an alkyl group having up to 8 carbon atoms, in the presence of a catalyst which promotes the addition reaction between the alkenyl and the SiH group. Such catalysts are well known and are preferably platinum based compounds. They include chloroplatinic acid, platinum acetylacetonate, complexes of platinous halides with unsaturated compounds such as ethylene, propylene, organovinylsiloxanes and styrene, hexamethyl diplatinum, $PtCl_2.PtCl_3$ and $Pt(CN)_3$. MQ resins having silicon-bonded hydrogen atoms which are suitable as reagents in the method of the invention preferably have no more than 3% of all monovalent units with substituents which are different from R or H, for example OR or OH. They may be prepared according to methods which have been described in e.g. British Patent Specification 1 418 601 and European Application 251 435. These include the cohydrolysis of orthosilicates, hexaalkyl disiloxanes and hydrogen tetraalkyl disiloxanes and the reaction of MQ resins where the M units are trialkylsiloxane groups with dihydrogen tetraalkyl disiloxane, in the presence of an acidic catalyst Silanes $XSi(OR^*)_3$ which are suitable in this preparation method of the resins of the invention include vinyl trimethoxy silane, vinyl triethoxy silane and allyl trimethoxy silane. It is preferred that X denotes a vinyl group. The reaction between the reagent MQ resin having silicon-bonded hydrogen atoms and the silane $XSi(OR^*)_3$ may be carried out in the presence of a solvent in which the silane and resin are soluble or dispersible, e.g. an aromatic solvent such as toluene. At least one silane should be provided per SiH group of the MQ resin, but preferably the silane is provided in an excess molar ratio. The amount of catalyst used is preferably such that from 1 to 40 parts or Pt by weight are provided per million parts by weight of the reagent MQ resin having silicon-bonded hydrogen atoms and the silane $XSi(OR^*)_3$ combined. The reaction is preferably carried out at elevated temperatures, for example 80 to 200° C. Completion of the reaction can be detected e.g. by measuring the absorbance band of SiH in the infrared spectrum.

Compared with MQ resins, which have been described in the prior art, e.g. in G.B. Patent Specifications 603 076 and 706 719 where alkoxy groups, when present, are linked directly to the monofunctional silicon atom, the alkoxy reactivity of the resin molecules of the present invention is increased as each R' bearing monofunctional siloxane unit carries three alkoxy groups. The MQ resins of the invention tend in general to have a lower viscosity than the corresponding MQ resins from which they are prepared.

Silicone elastomer-forming compositions which comprise alkoxy functional silicon compounds are known. Such compounds are used e.g. as crosslinking agents for polydiorganosiloxanes having silanol groups in the terminal siloxane units of the polymer. These crosslinking agents are usually tri- or tetraalkoxy silanes or short chain polydiorganosiloxanes having three or more alkoxy groups. In order to give the elastomer-forming compositions sufficient strength when formed into elastomers, one or more reinforcing additives are usually included. Suitable additives include reinforcing fillers, for example silica, polysilicates and resins. Resins which are useful include MQ resins having residual Si—OH groups.

G.B. Patent Specification 1 523 105 describes an organosilicon composition which comprises a mixture of certain $\alpha,\omega$ dihydroxy diorganosiloxane polymers, an organosilicon MQ resin having alkyl, halogenoalkyl, vinyl or phenyl substituents linked to the silicon atoms, certain alkoxylated organosilicon monomers or polymers (e.g. polysilicates), an organic derivative of titanium and optionally fillers. The use of fairly large amounts of filler or resin, e.g. 5 to 50% by weight based on the total weight of the composition, results in compositions which have elevated viscosity. These compositions are useful in certain applications, e.g. as sealants although their high viscosity tends to make the manufacture and manipulation of the elastomer-forming compositions more difficult. In certain applications a flowable composition having a relatively low viscosity is preferred, e.g. where self levelling of the compositions is desired. A reduced viscosity could be achieved by decreasing the amount of reinforcing filler used, but this results in an elastomer with greatly inferior physical properties. Compositions which have been developed for applications where self levelling is required, however, still tend to suffer from pseudo-plasticity effects, thus not always providing the amount of self levelling which is desired. Another method of reducing the viscosity of the uncured composition is to include solvent. This solution, however, results in a composition which shrinks upon curing and also releases solvent into the atmosphere which is undesirable both environmentally and economically.

We have now found that the use of the alkoxy functional MQ resins of the invention in certain elastomer-forming organosilicon compositions can provide uncured compositions with an acceptable flowability, whilst retaining desirable physical characteristics in the cured elastomer. The MQ resin can serve both as crosslinker and as reinforcing agent thereby eliminating the need for extra fillers or crosslinking agents, although such components may be added to adapt the composition for particular applications.

According to another aspect of the invention there is provided an organosilicon elastomer-forming composition which comprises (i) an $\alpha,\omega$ dihydroxy diorganopolysiloxane, (ii) a MQ resin which consist essentially of units of the general formula $R_aR'_{3-a}SiO_{\frac{1}{2}}$ and $SiO_{4/2}$, wherein R denotes an alkyl or aryl group having up to 8 carbon atoms, R' is a group of the general formula —R"Si(OR*)$_3$, wherein R" is a divalent alkylene group having up to 10 carbon atoms in the chain linking the two silicon atoms together, R* is an alkyl group having up to 8 carbon atoms and a has a value of 2 or 3, provided that at least one R' group is present per molecule and (iii) a catalyst.

$\alpha,\omega$ dihydroxy diorganopolysiloxanes which are employed as Component (i) of the compositions of the invention are well known and commercially available materials. They have the general structure HO[SiZ$_2$O]$_n$H wherein each Z independently denotes an organic substituent, preferably an alkyl or aryl group having up to 18 carbon atoms and n denotes an integer. Preferably Z is a methyl group. Small amounts of trivalent or tetravalent units of the respective formulae $ZSiO_{\frac{3}{2}}$ or $SiO_2$ may also be present causing a certain amount of branching to occur in the polymer. Their manufacturing process has been described in various documents, for example G.B. Patent Specifications 784 424, 899 937 and 1 506 734. They may vary in viscosity at 25° C. from 100 mm$^2$/s to 10 m$^2$/s, but preferably have a viscosity of from 1000 mm$^2$/s to 0.1 m$^2$/s.

Component (ii) can be used in amounts of from 1 part by weight per 100 parts by weight of Component (i). The highest loading levels are dependant on the viscosity of Component (i) and on the desired viscosity of the uncured composition. Preferably no more than 150 parts by weight are used for every 100 parts by weight of Component (i). In order to provide sufficient physical strength to the cured composition it is preferred that from 20 to 100 parts by weight of Component (ii) are used per 100 parts by weight of Component (i).

Component (iii) of the compositions of the invention is a condensation catalyst for the reaction of silanol groups with alkoxylated silicon atoms. Such catalysts are known and include carboxylic acid salts of a metal, preferably tin or lead. The carboxylic acid salts may be monoor dicarboxylic acid salts, for example stannous octoate, stannous acetate, stannous naphthenate, dibutyltin dilaurate, dibutyltin diacetate and dioctyltin diacetate. Preferably from 0.1 to 5% by weight of the catalyst is used based on the weight of Component (i).

The compositions of the invention may also contain small amounts of unreacted MQ resins used in the preparation of the alkoxy functional resins of the invention and other ingredients which are known as components of elastomer-forming compositions. These include fillers, e.g. calcium carbonate, silica and quartz, pigments, preservatives, adhesion promoters e.g. silanes having epoxy or amino and/or alkoxy functional substituents, cure inhibitors or cure accelerators and extenders such as trimethyl silyl endblocked polydimethyl siloxanes.

The compositions of the invention are capable of curing to elastomers at room temperature. Curing may be accelerated if desired by using elevated temperatures. Because the compositions of the invention can cure to an elastomer at room temperature, either by themselves or under the influence of atmospheric moisture, extending the shelf life of the compositions of the invention may be achieved by packing the compositions in one pack by incorporating a cure inhibitor. Alternatively the compositions may be packaged in two parts, one containing part of the first component and the catalyst, the second part containing the remainder of the first component together with the second component. Preferably a container which is sufficiently impermeable to water is used to ensure that premature curing does not take place prior to the use of the compositions.

The compositions of the invention can be prepared by mixing the different components together in any order. Standard homogenisation equipment can be used, e.g. mixers and blenders.

The compositions of the invention are particularly useful as self levelling sealants and as potting compounds e.g. for electronic systems.

There now follow a number of examples which illustrate the invention. All parts are by weight unless stated otherwise.

EXAMPLE 1

A MQ resin was prepared according to the teaching of E.P. Application 251 435 resulting in a resin having a number average molecular weight of 740 and a ratio of $M:M^h:Q$ of 1.1:0.2:1, wherein M denotes a group of the formula $(CH_3)_3SiO_{\frac{1}{2}}$, $M^h$ has the formula $H(CH_3)_2SiO_{\frac{1}{2}}$ and Q has the formula $SiO_{4/2}$. The resin had 3.98% as SiH in the molecule and had a viscosity of 1370 $mm^2/s$.

200g of the MQ resin thus prepared was added to a mixture of 0.8g of a platinum complex and 75g of toluene. The amount of catalyst was calculated to give $10^{-4}$ mole of Pt per mole of —SiH. The mixture was heated to 95° C., after which 46,8g (18 mole% excess) of vinyltrimethoxy silane was added. A small exothermic reaction was observed. The mixture was then heated to 124° C. and maintained at that temperature for one hour. When cooled to room temperature, the degree of conversion was determined by measuring the absorbance peak for SiH in infrared spectrometry as 98.2%. The mixture was then stripped under reduced pressure (6 mbar) at 102° C. for 30 minutes, followed by filtration through a 5 micron membrane. The resulting resin has a ratio of $M:M^a:Q$ of 1.1:0.2:1 wherein M and Q are as defined above and $M^a$ is $(CH_3O)_3Si(CH_2)_2(CH_3)_2SiO_{\frac{1}{2}}$. NMR spectrometer data showed a value of 9.5% MeO, 3.2% $CH_2CH_2$ and 29.2% silicon-bonded methyl (compared with 10.5, 3.2 and 28.4% theoretical value). The resin was a clear light brown liquid having a number average molecular weight of 1414. After storage for 10 weeks the viscosity had not changed giving a value of 862 $mm^2/s$. This value is lower than the viscosity of the starting MQ resin in spite of an increase in molecular weight.

EXAMPLE 2

50 parts of the MQ resin prepared in Example 1 were mixed with 50 parts of an $\alpha,\omega$ dihydroxyl end-blocked polydimethyl siloxane having a viscosity of about 13.5 Pa.s and 2 parts dibutyl tin dilaurate. The mixture was a flowable composition having a viscosity of about 4.2 Pa.s. After 3 days at room temperature the composition had cured to a strong transparent elastomer having a Shore A hardness of 37.

EXAMPLE 3

A MQ resin was prepared according to the teaching of E.P. Application 251 435 resulting in a resin having a molecular weight of 1020, a number average molecular weight of 705 and a ratio of $M:M^h:Q$ of 1.4:0.4:1, wherein M denotes a group of the formula $(CH_3)_3SiO_{\frac{1}{2}}$, $M^h$ has the formula $H(CH_3)_2SiO_{\frac{1}{2}}$ and Q has the formula $SiO_{4/2}$. The resin had 6.2% as SiH in the molecule and had a viscosity of 84 $mm^2/s$.

Reaction with vinyltrimethoxy silane was carried out as described in Example 1 except that 75.78g of the silane were used and 0.64g of the Pt complex, equivalent to $5 \times 10^{-5}$ mole of Pt per mole of SiH. The resulting resin has a ratio of $M:M^a:Q$ of 1.4:0.4:1, wherein $M^a$ and Q are as defined above. NMR spectrometer data showed a value of 14.3% MeO, 3.0% $CH_2CH_2$ and 27.9% silicon-bonded methyl (compared with 14.3, 4.3 and 28.9% theoretical value). The resin was a clear nearly water-white liquid having a molecular weight of 1233. After storage for 10 weeks the viscosity had not changed, giving a value of 100.5 $mm^2/s$.

EXAMPLE 4

50 parts of the resin of Example 3 were mixed with 50 parts of a polydimethylsiloxane having terminal silanol groups and having a viscosity at 25° C. of 16,660 mPa.s and 2 parts of dibutyl tin dilaurate. The resulting blend having a viscosity of 2976 mPa.s was cured and the Shore A Hardness was tested after 5 days curing at room temperature. It was found to have a value of 63.

EXAMPLE 5

A MQ resin was prepared according to prior art methods resulting in a resin having a ratio of $M:M^h:Q$ of 0.7:0.8:1, wherein M, $M^h$ and Q are as in Example 1.

1027.5g of the MQ resin thus prepared, was loaded into a mixture of 15.8g of a platinum complex and 630g of toluene. The amount of catalyst was calculated to give $10^{-4}$ mole of Pt per mole of —SiH. The mixture was heated to about 100° C. after which 864.3g of vinyltrimethoxy silane was added, which gives 20 mole% excess. A small exothermic reaction was observed. The mixture was then maintained at that temperature for 8 hours until no further reduction of the absorbance peak at $2160 cm^{-1}$ was observed. The mixture was then stripped under reduced pressure (50 mbar) at 120° C. The resulting resin has a ratio of $M:.M^a:Q$ of 0.7:0.8:1, wherein M and Q are as defined above and $M^a$ is $(CH_3O)_3Si(CH_2)_2(CH_3)_2SiO_{\frac{1}{2}}$. The resin had a number average molecular weight of 893.8, a viscosity of 199mPa.s and contained 20.69% of methoxy groups.

EXAMPLE 6

50 parts of the resin of Example 5 were mixed with 50 parts of a polydimethylsiloxane having terminal silanol groups and having a viscosity at 25° C. of 16,660 mPa.s and 2 parts of dibutyl tin dilaurate. The resulting blend having a viscosity of 6640mPa.s was cured and the Shore A Hardness was tested after 5 days curing at room temperature. It was found to have a value of 71.

That which is claimed is:

1. A MQ resin consisting of tetravalent units of the general formula $SiO_{4/2}$ and monovalent units essentially all of said monovalent units having the general formula $R_aR'_{3-a}SiO_{\frac{1}{2}}$ wherein R is selected from the group consisting of alkyl and aryl groups having from 1 to 8 carbon atoms, R' denotes a group of the general formula $-R''Si(OR^*)_3$, wherein R'' is a divalent alkylene group having up to 10 carbon atoms in the chain linking the two silicon atoms together, R is an alkyl group having up to 8 carbon atoms and a has a value of 2 or 3, there being at least one R' group per molecule.

2. A MQ resin according to claim 1 wherein in 0.1 to 30% of all monovalent units the value of $a = 2$.

3. A MQ resin according to claim 1 wherein the ratio of monovalent units to tetravalent units is from 0.4:1 to 2:1.

4. A MQ resin according to claim 3 which is liquid having a ratio of monovalent units to tetravalent units which is greater than 1.2:1.

5. A MQ resin according to claim 1 wherein R'' is dimethylene and $R^*$ is methyl.

6. A method of making a MQ resin consisting of tetravalent units of the general formula $SiO_{4/2}$ and monovalent units whereof essentially all have the general formula $R_aR'_{3-a}SiO_{\frac{1}{2}}$ wherein R is selected from the group consisting of alkyl and aryl groups having from 1 to 8 carbon atoms, R' is a group of the general formula $-R''Si(OR^*)_3$ wherein R'' is a divalent alkylene group having up to 10 carbon atoms in the chain linking the two silicon atoms together, $R^*$ is an alkyl group having up to 8 carbon atoms and a has a value of 2 or 3, there being at least one R' group per molecule, which comprises reacting a reagent MQ resin which consist essentially of tetravalent units of the general formula $SiO_{4/2}$ and monovalent units of the general formula $R_aH_{3-a}SiO_{\frac{1}{2}}$ wherein R and a are as defined above, there being at least one silicon-bonded hydrogen atom per molecule, with a silane of the general formula $XSi(OR^*)$ wherein X represents an alkenyl group having up to 10 carbon atoms in the chain linked to the silicon atom and $R^*$ is as defined above in the presence of a platinum compound catalyst which promotes the addition reaction between the alkenyl group X and the SiH group of the reagent MQ resin.

7. A method of making MQ resins according to claim 6 wherein the amount of silane used results in a ratio of SiX groups of the said silane over SiH groups of the reagent MQ resin which is greater than 1.

8. A method according to claim 6 wherein the catalyst is used in an amount giving from 1 part to 40 parts by weight of Pt per million parts of the combined weight of the reagent MQ resin and the silane.

9. A method according to claim 6 wherein X denotes a vinyl group.

10. An organosilicon composition which upon curing forms an elastomer comprising (i) an $\alpha,\omega$ dihydroxy diorganopolysiloxane, (ii) a MQ resin consisting of tetravalent units of the general formula $SiO_{4/2}$ and monovalent units, whereof essentially all have the general formula $R_aR'_{3-a}SiO_{\frac{1}{2}}$ wherein R is selected from the group consisting of alkyl and aryl groups having from 1 to 8 carbon atoms, R' is a group of the general formula $-R''Si(OR^*)_3$, wherein R'' is a divalent alkylene group having up to 10 carbon atoms in the chain linking the two silicon atoms together, $R^*$ is an alkyl group having up to 8 carbon atoms and a has a value of 2 or 3, there being at least one R' group per molecule and (iii) a catalyst.

11. An organosilicon composition according to claim 10 wherein Component (i) has a viscosity at 25° C. of from 1000 $mm^2/s$ to 0.1 $m^2/s$.

12. An organosilicon composition according to claim 10 which comprises from 20 to 100 parts by weight of Component (ii) per 100 parts by weight of Component (i).

13. An organosilicon composition according to claim 10 wherein the catalyst is selected from the group consisting of carboxylic acid salts of tin and carboxylic acid salts of lead.

14. An organosilicon composition according to claim 10 wherein Component (i) is an $\alpha,\omega$ dihydroxy polydimethylsiloxane.

15. An organosilicon composition according to claim 10 which also comprises components selected from the group consisting of fillers, adhesion promoters, cure inhibitors, and cure accelerators.

* * * * *